(12) United States Patent
Hofmann et al.

(10) Patent No.: US 7,431,454 B2
(45) Date of Patent: Oct. 7, 2008

(54) METHODS FOR DESIGNING TINTED CONTACT LENSES

(75) Inventors: Gregory J. Hofmann, Jacksonville Beach, FL (US); Douglas G. Clark, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 205 days.

(21) Appl. No.: 11/390,010

(22) Filed: Mar. 27, 2006

(65) Prior Publication Data
US 2007/0222944 A1 Sep. 27, 2007

(51) Int. Cl.
*G02C 7/02* (2006.01)
*G02C 7/04* (2006.01)

(52) U.S. Cl. .................................. 351/177; 351/162
(58) Field of Classification Search ............. 351/162, 351/177
See application file for complete search history.

(56) References Cited

U.S. PATENT DOCUMENTS

| 4,889,421 A * | 12/1989 | Cohen ..................... 351/162 |
| 5,120,121 A | 6/1992 | Rawlings et al. |
| 5,260,727 A * | 11/1993 | Oksman et al. ........... 351/162 |
| 2002/0039172 A1 | 4/2002 | Ocampo |
| 2002/0196409 A1* | 12/2002 | Jani ........................ 351/162 |
| 2003/0025873 A1 | 2/2003 | Ocampo |

FOREIGN PATENT DOCUMENTS

WO    WO 01/96934 A2    12/2001

OTHER PUBLICATIONS

Bourke, Paul, "An Introduction to Fractals," In *A New Kind of Science*, Wolfram, Stephan, Wolfram Media, Inc. (2002).

* cited by examiner

*Primary Examiner*—Jordan M Schwartz
(74) *Attorney, Agent, or Firm*—Lois Gianneschi

(57) ABSTRACT

The invention provides methods for designing patterns for use in tinted contact lenses in which the patterns are generated using algorithms. The method of the invention provides an objective description of the pattern for purposes of tooling, metrology and manufacturing of a lens incorporating the pattern.

12 Claims, 9 Drawing Sheets

METHODS FOR DESIGNING TINTED CONTACT LENSES

FIELD OF THE INVENTION

The invention relates to tinted contact lenses. In particular, the invention provides methods for designing contact lenses that either enhance or change the color of one or more of a lens wearer's iris, limbal ring, and pupil.

BACKGROUND OF THE INVENTION

The use of tinted, or colored, contact lenses to either or both alter the natural color of the eye and to mask ophthalmic abnormalities is well known. Typically, these lenses incorporate a pattern in the portion of the lens that overlies one or more of the iris, pupil, and limbal ring of the lens wearer when the lens is on-eye.

The conventional method for providing the pattern is drawing the pattern by hand or by using a computer graphics program. Alternatively, the pattern may be formed by taking a digital image of one or more of an actual iris, pupil or limbal ring and extracting portions of the images for use in a pattern. These methods are disadvantageous in that accurately describing the resulting patterns for purposes of creating tooling for production of lenses incorporating the pattern, application of the pattern to a lens mold, pattern metrology and the like are challenging due to the complex geometries of the patterns.

DETAILED DESCRIPTION OF THE INVENTION AND PREFERRED EMBODIMENTS

The invention provides methods for designing patterns for use in tinted contact lenses, methods for the manufacture of such lenses, and lenses incorporating the patterns in which the patterns are generated using algorithms. The resulting patterns, when incorporated into a contact lens, serve to enhance or alter the color of one or more of the wearer' iris, pupil, and limbal ring. The method of the invention provides an objective description of the pattern for purposes of tooling, metrology and manufacturing of a lens incorporating the pattern.

In one embodiment, the invention provides a method for producing patterns for tinted contact lenses comprising, consisting essentially of, and consisting of the step of generating at least a portion of a pattern using at least one algorithm. For purposes of the invention by "algorithm" is meant a set of rules that produce a set of points and includes, without limitation, one or more mathematical formulae.

In the method of the invention, one or more algorithms are used to generate at least a portion of a pattern useful in a tinted contact lens. Algorithms for use in the invention are fractal in nature. Suitable algorithms may be derived from structures such as, without limitation, chaotic systems, diffusion systems, aggregation systems, L-systems, P-system, cellular automata and the like.

Figure 1:
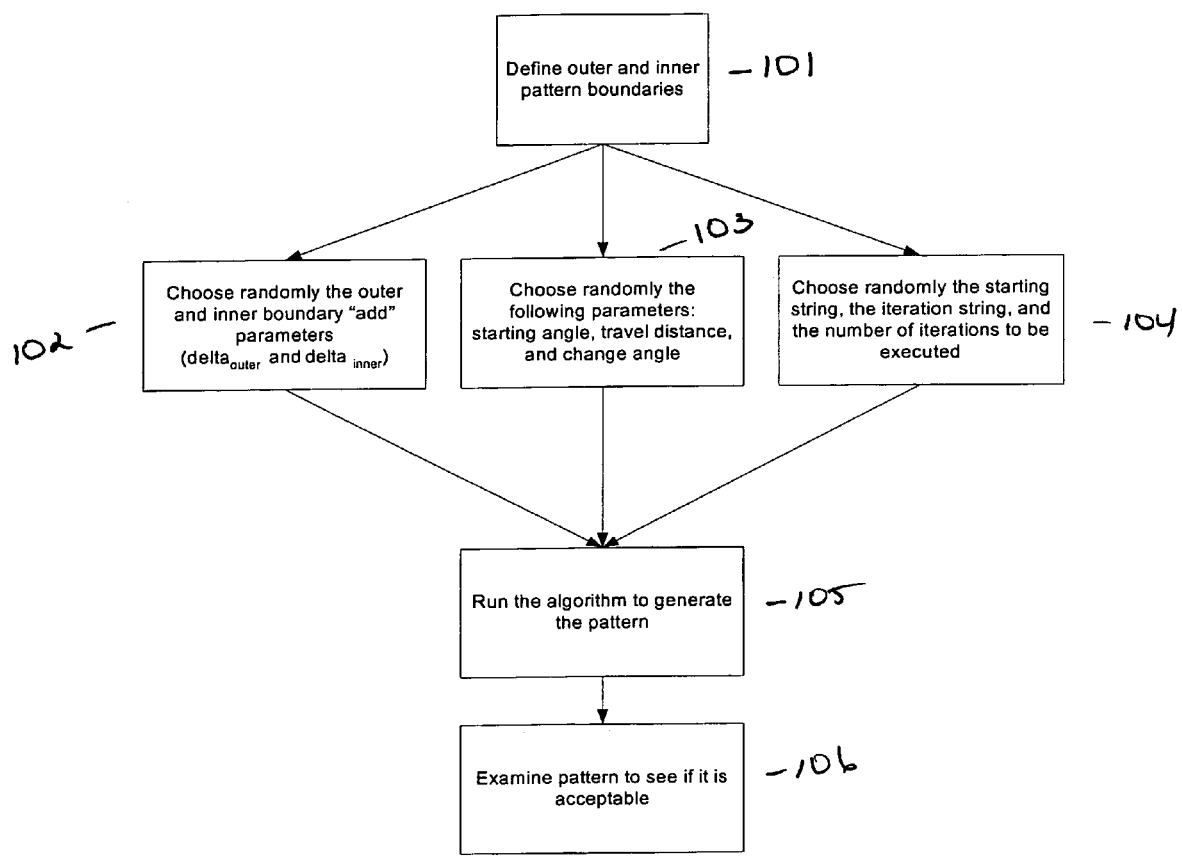
FIG. 1 is a flow diagram of a method of the invention.

As one example, the algorithm is derived from an L-system. Shown in FIG. 1 is a flow diagram for deriving such an algorithm and producing a pattern according to the invention. In a first step (101), the inner and outer pattern boundaries are defined. The boundaries may be of any suitable size and shape. Typically, the boundaries will be that of the average radius of one or more of the human pupil, iris, and limbal ring. The outer and inner boundaries may be changed by adding or subtracting a small fraction, delta$_{inner}$ or delta$_{outer}$, of the corresponding starting radius to the boundary (102). This change may be made stochastic by multiplying delta$_{inner}$ or delta$_{outer}$ by a random number between 0 and 1, the resulting effect of which will be to make the boundary appear more natural. The change may be made, and random variable selected, at each iteration step, meaning at each time a line segment is drawn. Additionally, a starting angle, travel distance, and change angle are randomly selected (103) along with the starting string, iteration string, and number of iterations to be executed (104). The algorithm is then run to generate a pattern (105) and a determination is made as to whether the resulting pattern is acceptable (106). If the pattern is not acceptable, the process is repeated changing some or all of the parameters and constraints.

In a more specific example, an algorithm is derived from an L-system and the boundary conditions limit the graphical commands of the L-system's symbols to an area that is substantially equal to the area covered by a conventional cosmetic lens iris pattern. Additionally and preferably, a stochastic element is provided to this L-system. More particularly, a $5^{th}$ order L-system is constrained to produce a pattern within a region defined by two circles. In other words, the pattern ("P") is produced within a region defined by:

$$R_{outer} \pm \text{delta}_{outer} < P < R_{inner} \pm \text{delta}_{inner}$$

wherein $R_{outer} \pm \text{delta}_{outer}$ is a radius of a circle, which radius is substantially equal to the average radius of the human iris plus or minus a fraction of the radius multiplied by a random variable between 0 and 1; and $R_{inner} \pm \text{delta}_{inner}$ is a radius of a circle, which radius is substantially equal to the average radius of the human pupil plus or minus a fraction of the radius multiplied by a random variable between 0 and 1.

The algorithm for this system begins with a starting string, or axiom, composed of symbols representing graphical commands. The commands are used by computer code to draw line segments, defined in units of pixels, that compose a pattern for use in a tinted lens. For example, the axiom may be the symbols "F–F" and, during the first iteration, an iteration string randomly chosen by the designer is substituted for each "F." The code then executes the command in the new string. In a second iteration, the iteration string is substituted for each "F" in the previous string and the code executes these commands.

For example, if the iteration string for the axiom "F–F" is "F+F+", after the first iteration the string is "F+F+–F+F+." After the second iteration, the string is "F+F++F+F+F++–F+F++F+F++." Subsequent iterations are carried out until a predefined number of iterations, determined by the order of the system, has occurred. For example, 5 iterations would be carried out for a $5^{th}$ order L-system. The order used will be determined by observation of which order provides the desired pattern.

Graphical meanings are associated with the symbols for the axiom. For example, the symbols for the axiom above are set forth in the table below.

| Symbol | Meaning |
| --- | --- |
| F | Draw line of prescribed travel distance from the previous position to the final position wherein the final position is defined by the direction angle and the travel distance. |
| + | Change current angle - turn left by turning angle. |
| & | Change current angle - turn right by turning angle. |
| − | Change angle by reflecting across horizontal (x) axis. |

In the table above, the travel distance is the selected length. The values for the travel distance, or length, of the line segment drawn when the F symbol is encountered, the turning angle, or the change in angle occurring when a "+" or "&" symbol is encountered, the iteration string, and the new starting position of the line segments when a boundary condition violation has occurred are all selected by the designer. Each of these values will be determined by the values that produce a desirable pattern, meaning a pattern that when incorporated into a lens achieves a desirable on-eye cosmetic effect.

Figure 2:
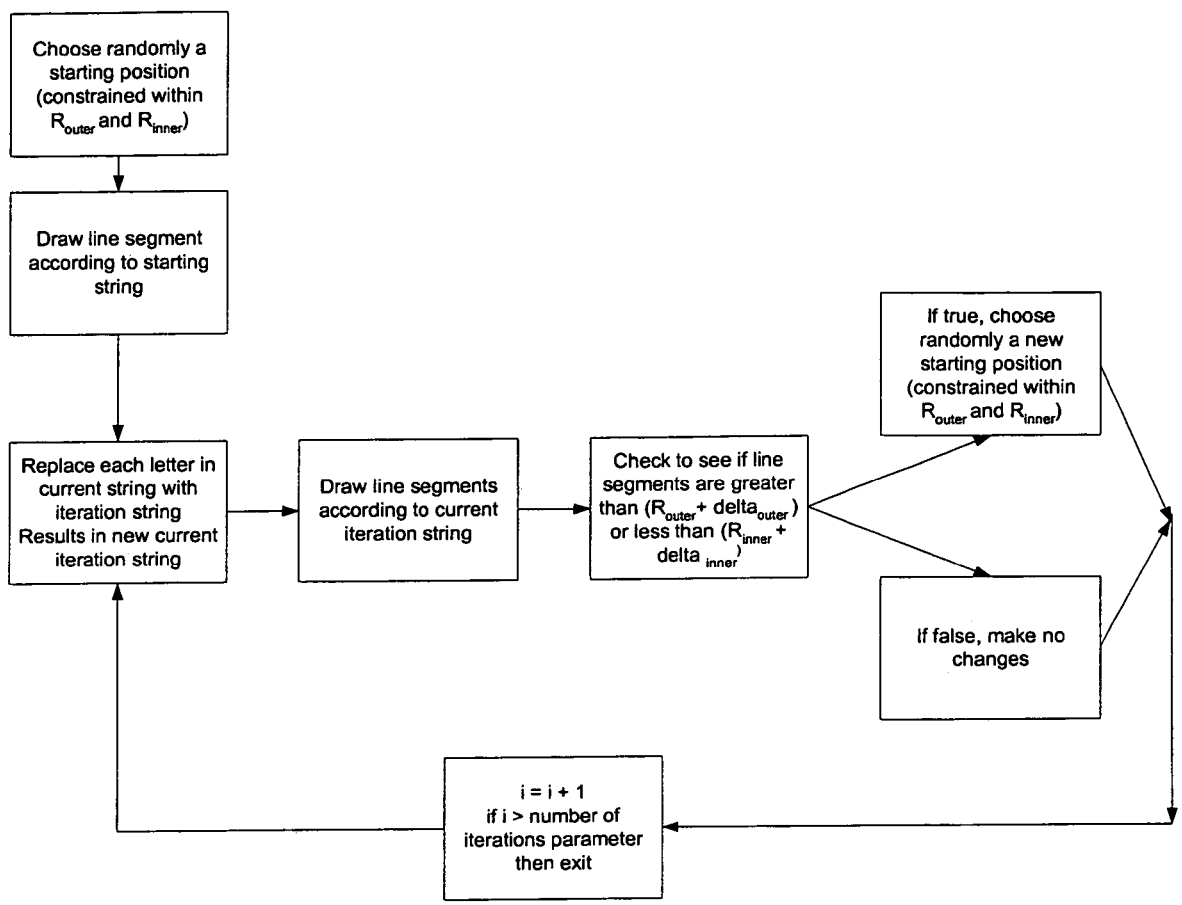
FIG. 2 is a flow diagram of a second method of the invention.

The starting position of the first line segment is chosen randomly at a position near the inner circle. If the line segments are to be drawn within $R_{outer} \pm delta_{outer}$ and within $R_{inner} \pm delta_{inner}$ and a line segment is greater than $R_{outer} \pm delta_{outer}$ or less than $R_{inner} \pm delta_{inner}$, a new starting position for the segments that is within these constraints will be randomly chosen at a distance times a random number between 0 and 1 from $R_{inner}$ after which the code will continue with the execution of the graphical commands. If a line segment is within $R_{outer} \pm delta_{outer}$ and $R_{inner} \pm delta_{inner}$ no change will be made. In FIG. 2 is a flow diagram of such a method.

Figure 3:
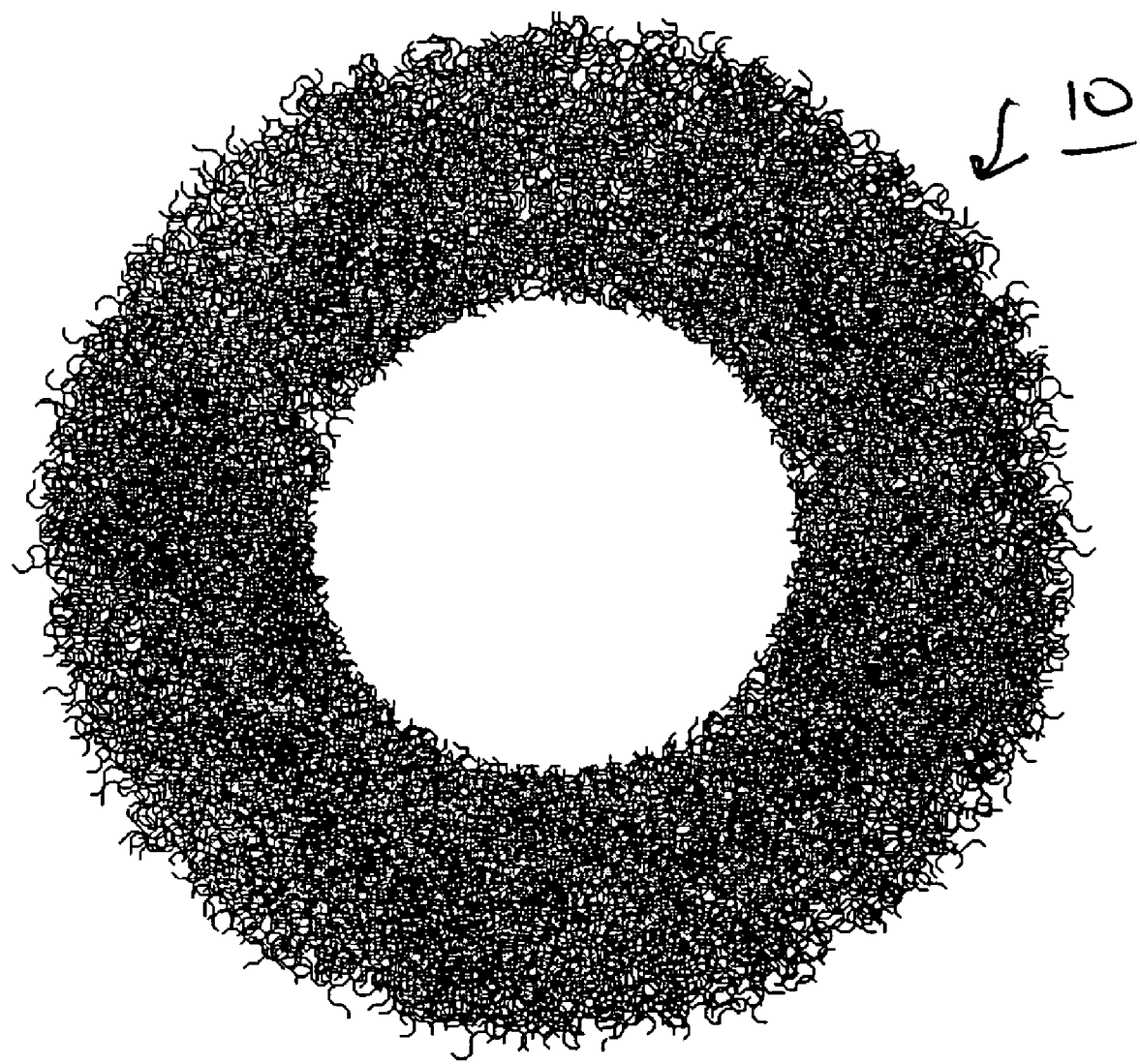
FIG. 3 is pattern produced according to a method of the invention.
Figure 4:
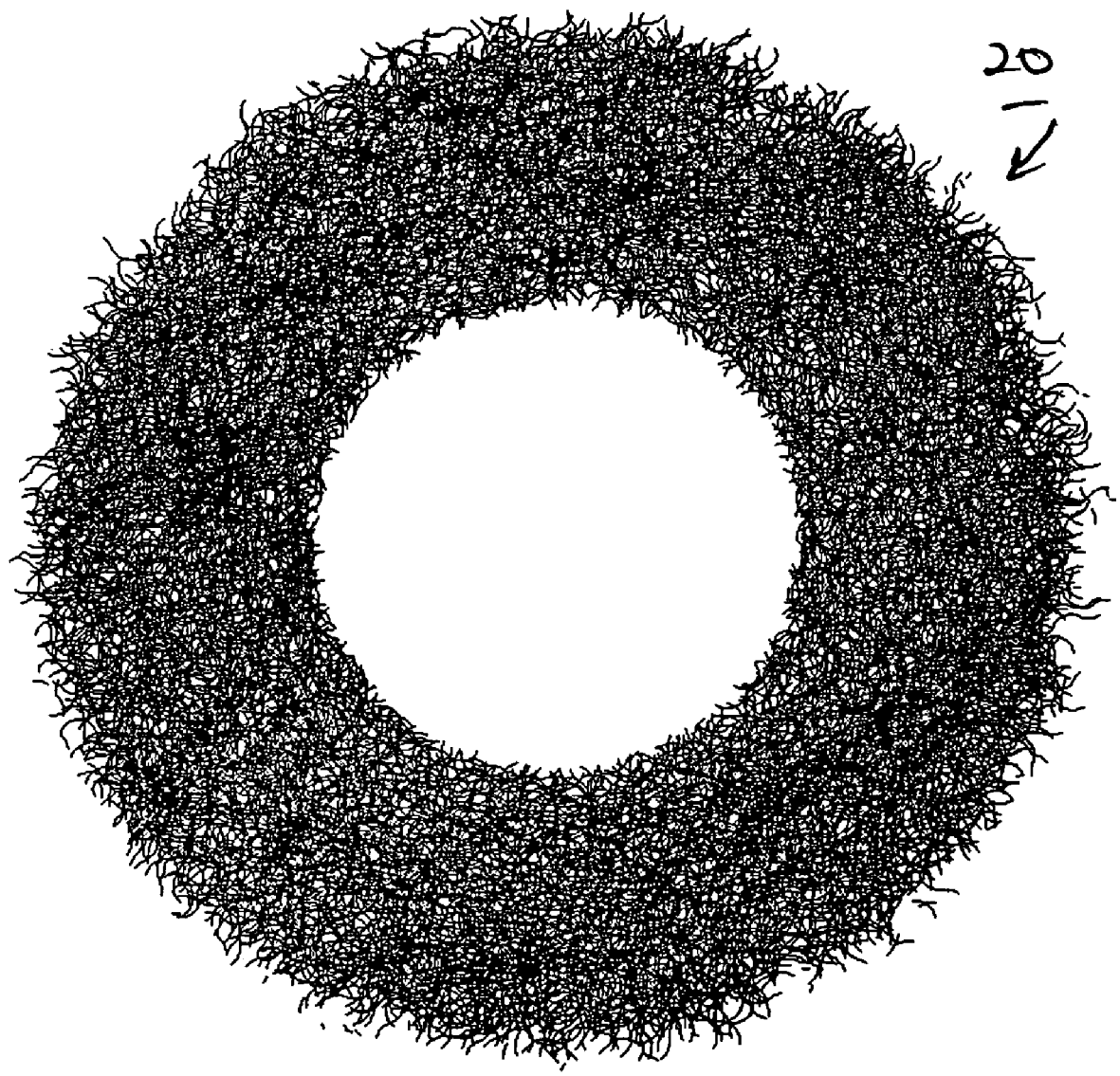
FIG. 4 is a second pattern produced according to a method of the invention.
Figure 5:
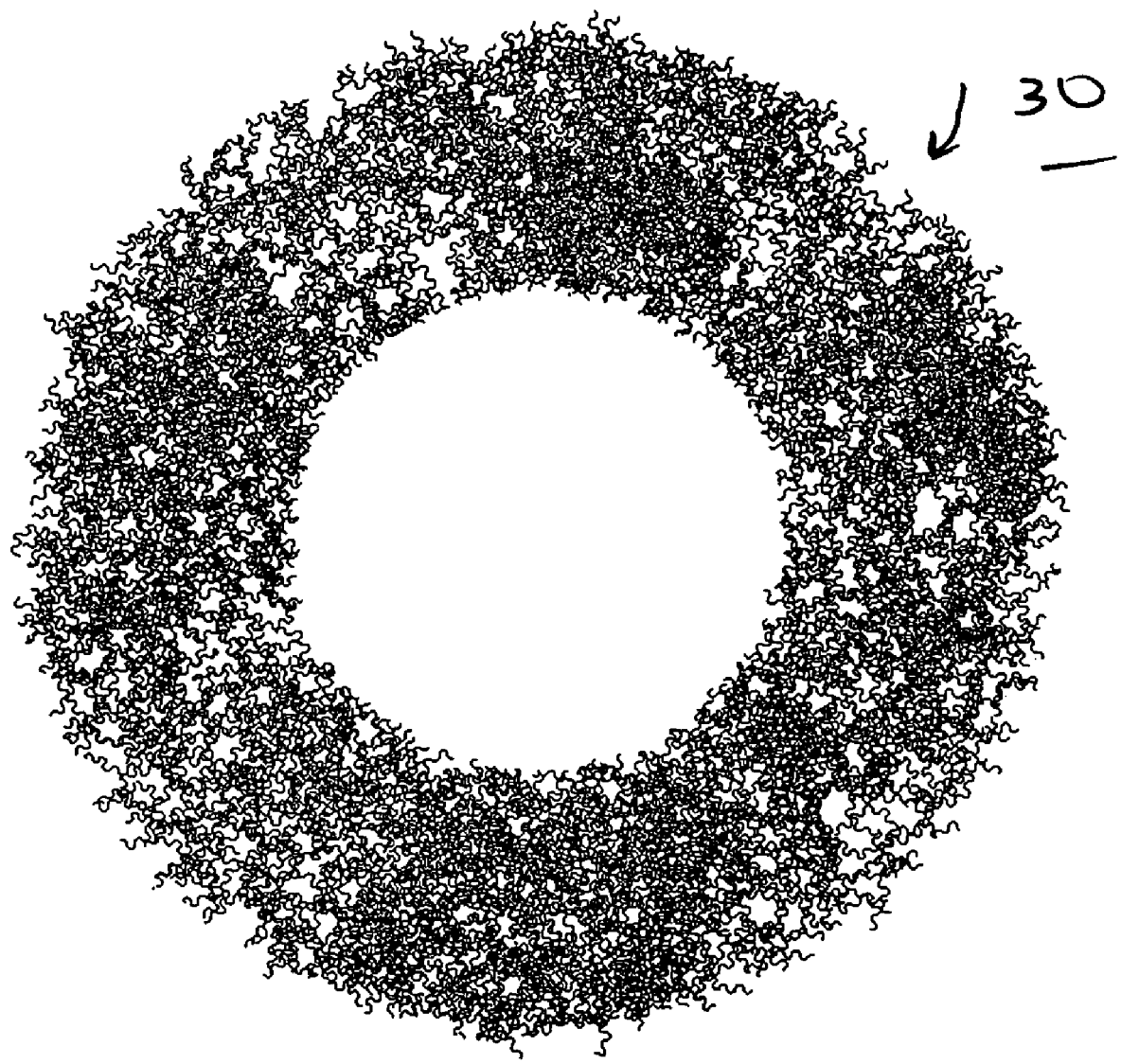
FIG. 5 is a third pattern produced according to a method of the invention.

FIGS. 3 through 5 are examples of patterns generated by the methods shown in FIGS. 1 and 2. For purposes of these figures, the outer and inner circles are 350 and 150 pixels, respectively. As shown in FIGS. 3 through 5, the inner and outer circle boundaries are fuzzy meaning that, when the final position of each line segment is defined, the algorithm checks to determine whether a boundary that changes randomly about the inner and outer circle boundaries was exceeded. Additionally, there is a stochastic nature to the algorithm used in that, if the boundary condition has been exceeded, a new starting position for the line segment will be selected randomly.

In FIG. 3 is depicted a pattern 10 suitable for use as a pattern in a cosmetic contact lens. The pattern 10 was generated after five iterations using the axiom F−F and the iteration string of F&F&F&F&F+F+F+F+. The starting angle was 180 degrees from the horizontal, the travel distance was 5 pixels, and the turning angle was 45 degrees and the rimover distance was 150 pixels. FIG. 4 depicts pattern 20 generated after 5 iterations and using the same axiom, iteration string, starting angle and travel distance as for FIG. 3, but using a turning angle of 22.5 degrees and a rimover distance of 200 pixels. The pattern 30 of FIG. 5 was generated as was the pattern for FIG. 3 except that a travel distance of 2 pixels was used.

The designs shown in FIGS. 3 through 5 are the result of the use of an algorithm used to draw line segments. As another example, an algorithm may be used to generate patterns similar to a physical process, such as diffusion. For example, a pattern may be developed by launching a defined number of circles and allowing each circle to find its location.

Figure 6:
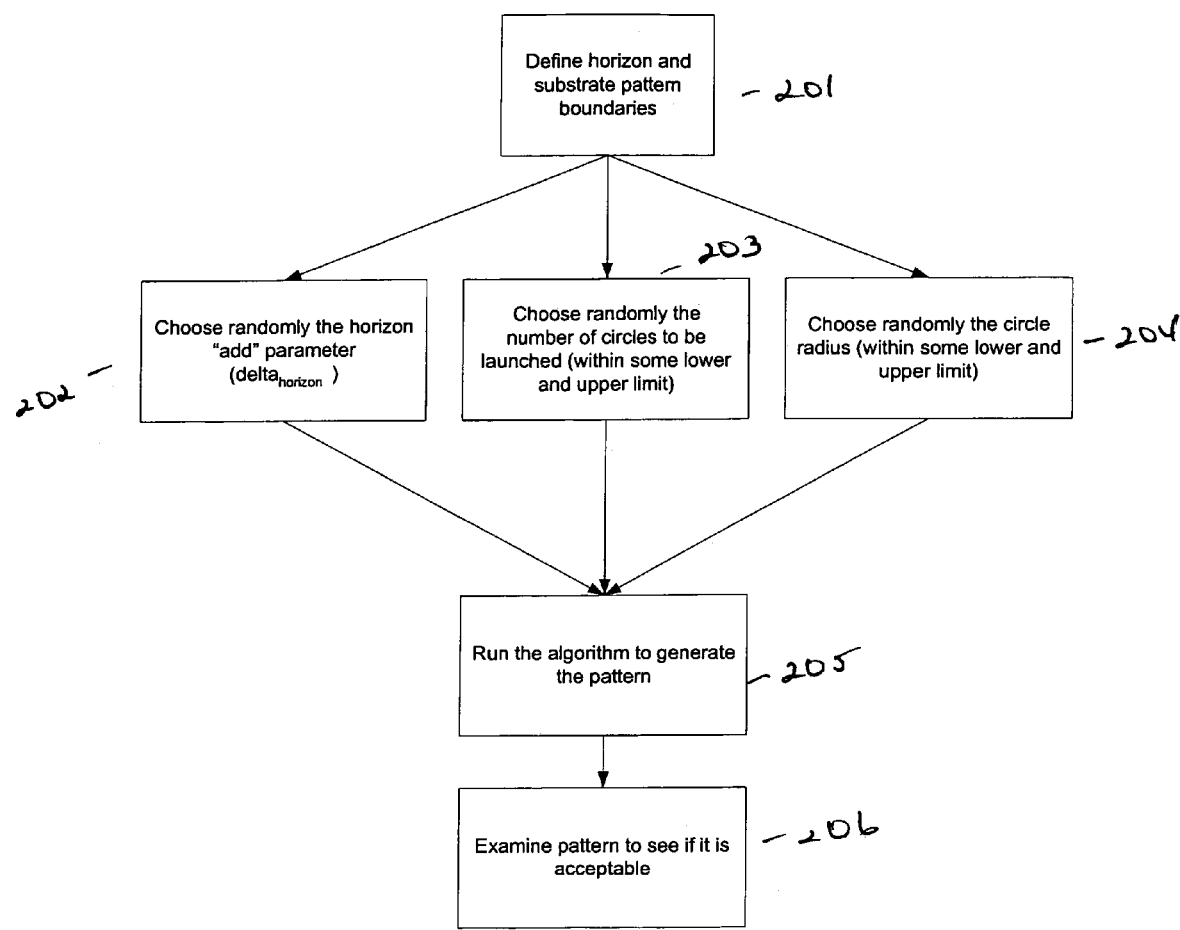
FIG. 6 is a flow diagram of a third method of the invention.

FIG. 6 shows a flow diagram of such a process. In a first step (201), horizon and substrate pattern boundaries, preferably which are circles, are defined. By horizon is meant the position from which the circles are launched. By substrate is meant the position at which the launched circles accumulate. The horizon and substrate circles may be of any radii, but preferably the horizon circle is concentric with and has a larger radius than the substrate circle. The horizon and substrate boundaries may be altered (202) at each iteration step by adding or subtracting a randomly chosen fraction of the corresponding starting horizon or substrate radius. The extent of this randomly chosen fraction will be determined by visually inspecting the impact this alteration has on the resultant pattern.

In this embodiment of the method of the invention, the criteria for selecting the minimum and maximum number of circles to be launched (203) is based on the extent to which the area between the circles is to be filled so as to produce a desirable pattern. This will be determined by visually inspecting the impact made on the resultant pattern when changing the minimum and maximum number of circles. The same criteria is used to select the maximum and minimum radius of the launched circles (204). The algorithm is then run to generate a pattern (205) and a determination is made as to whether the pattern is acceptable (206).

Figure 7:
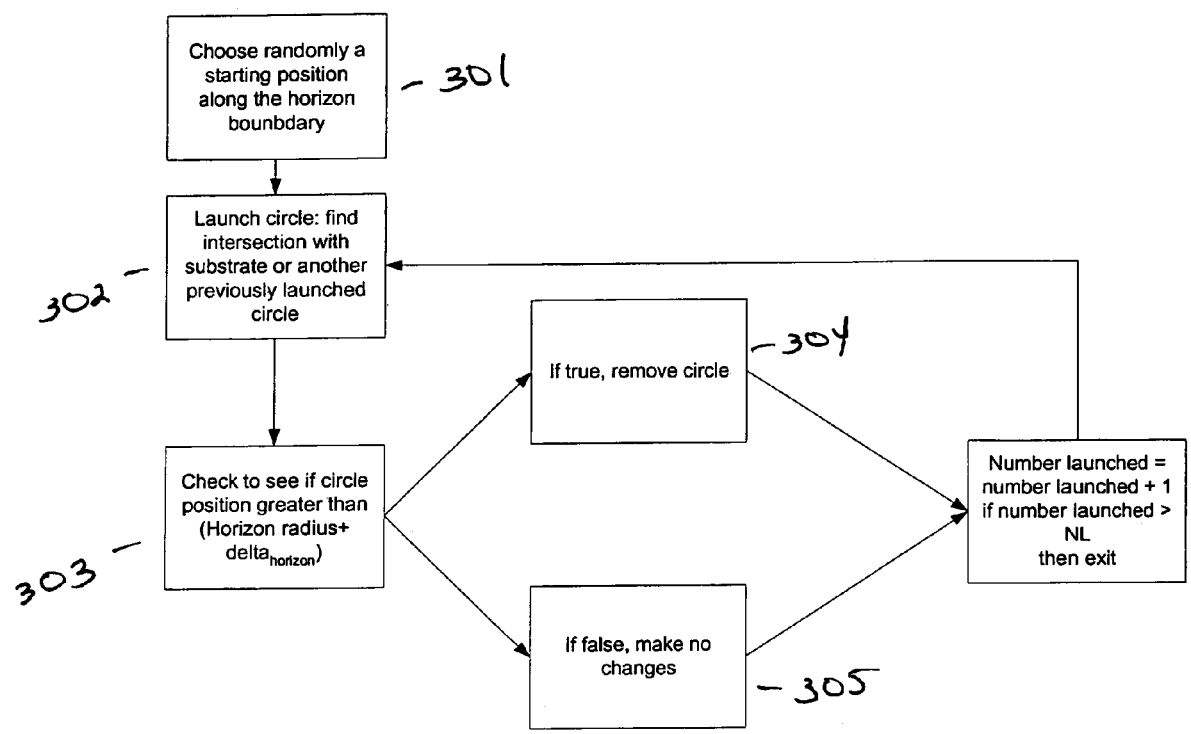
FIG. 7 is a flow diagram of a fourth method of the invention.

More specifically by way of example and as shown in the flow diagram of FIG. 7, the algorithm may be such that small circles are launched from a circular horizon using random locations and trajectories (301). Each circle is permitted to move until it either encounters another circle (302) or exceeds the $R_{horizon} \pm delta_{horizon}$ boundary (303). If a launched circle comes in contact with another such circle, it is placed at the point of contact and another circle is then launched from that point. If a launched circle moves beyond the $R_{horizon} \pm delta_{horizon}$ boundary, it is removed (304) and another circle is launched or if a launched circle is within the $R_{horizon} \pm delta_{horizon}$ boundary, no change is made (305). Alternatively, the horizon circle's radius may be randomly changed by a small amount when a query is made as to whether a particle has moved beyond the horizon circle radius.

As a launched circle traverses the region between other circles and the substrate circle, it may collide with a background particle. A background particle is a particle, preferably invisible, that changes the trajectory of one of the circles used to define the pattern. Such a collision is elastic in that the circle's trajectory may be changed by some random factor due to the collision. The probability of having such a collision may be controlled by use of a variable that acts similarly to a temperature and density variable and, thus, may be considered as a diffusion coefficient.

Figure 8:
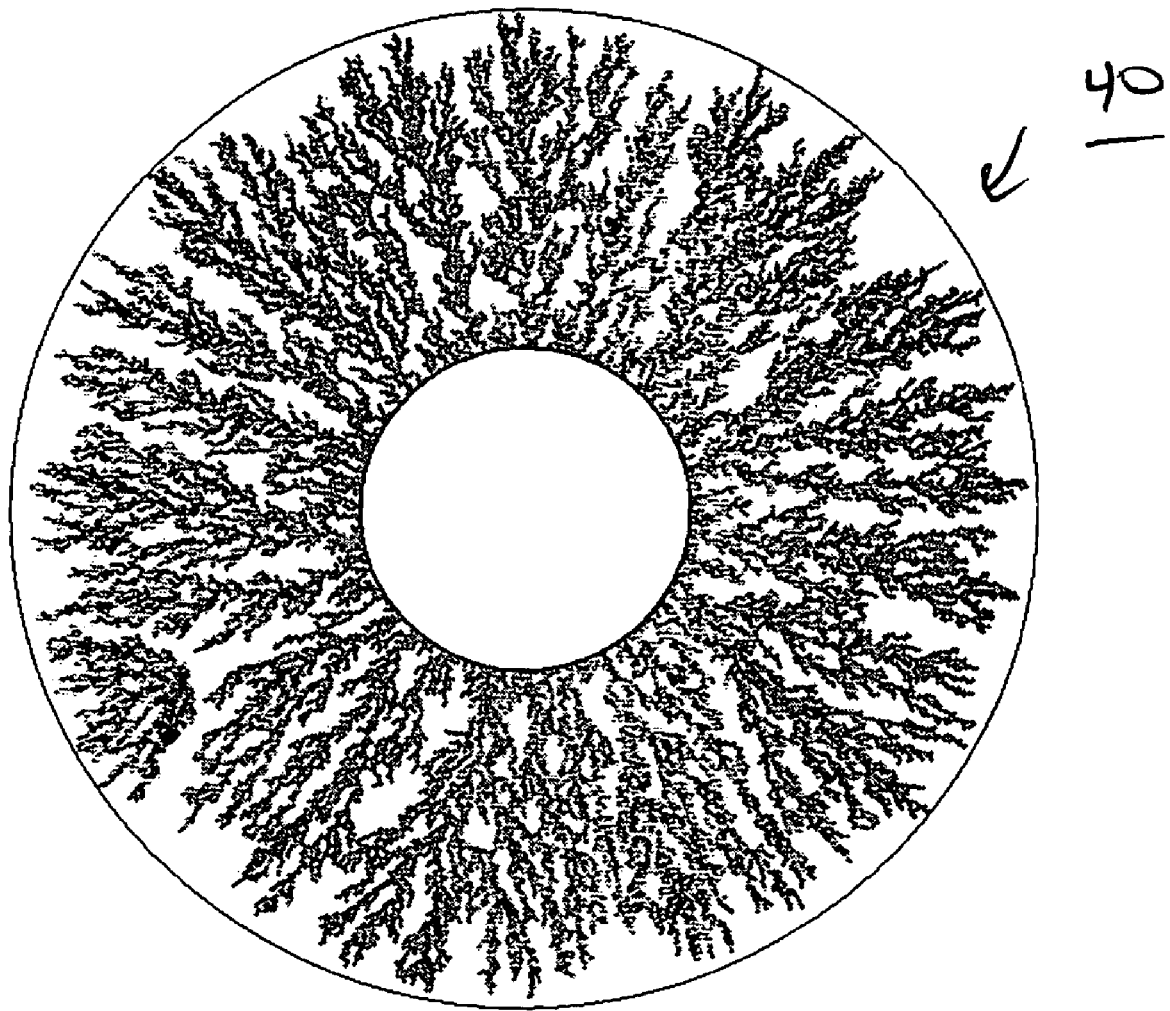
FIG. 8 is a fourth pattern produced according to a method of the invention.
Figure 9:
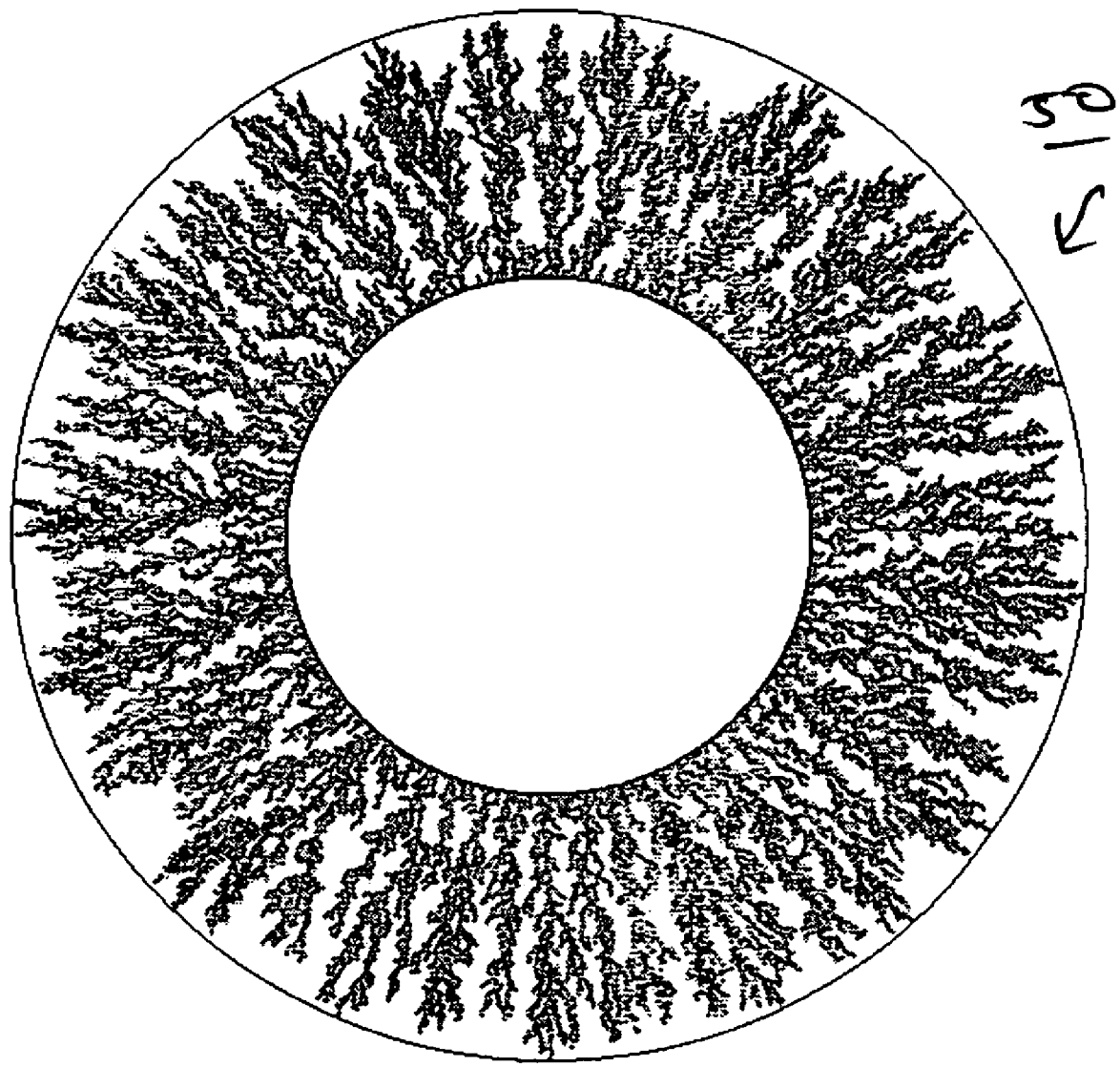
FIG. 9 is a fifth pattern produced according to a method of the invention.

Along with the collision probability, the designer may vary the horizon and substrate radii and the number of launched circles and their radii. In FIGS. 8 and 9 are shown examples using such an algorithm. For purposes of these examples, the diffusion coefficient was infinite, meaning that there were no background collisions.

In the FIG. 8 is shown pattern 40 generated using the above-described diffusion algorithm, a horizon radius of 750 pixels, a substrate radius of 450 pixels and 100,000 circles each having a radius of 1 pixel. Pattern 50 shown in FIG. 9 was generated using the diffusion algorithm, a horizon radius of 750 pixels, a substrate radius of 550 pixels, and 100,000 launched circles each with a radius of 1 pixel.

Using the method of the invention, patterns for tinted contact lenses may be created, which patterns are defined by one or more algorithms. The patterns may be used in a lens for either enhancing or altering one or more of the wearer's iris, pupil, and limbal ring color and the elements of the pattern may be translucent or opaque depending on the desired on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T.

The color of the pattern elements may be substantially the same as, or complementary to, each other and the color selected for the pattern elements will be determined by the natural color of the lens wearer's iris and the enhancement or color change desired. Thus, elements may be any color including, without limitation, any of a variety of hues and chromas of blue, green, gray, brown, black yellow, red, or combinations thereof. Preferred colors for a limbal ring include, without limitation, any of the various hues and chromas of black, brown and gray.

The pattern elements, may be made from any organic or inorganic pigment suitable for use in contact lenses, or combinations of such pigments. The opacity may be controlled by varying the concentration of one or both of the pigment and titanium dioxide used, with higher amounts yielding greater opacity. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

The elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. A colorant containing a binding polymer, solvent, and pigment or dye is then deposited onto the elements to fill the depressions with colorant. A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. If necessary, the mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays the pattern and may form the entirety of the lens' outermost surface. The clear, pre-polymer layer preferably is first applied to the mold surface and the colorant is subsequently applied to the pre-polymer. The pre-polymer may be any polymer that is capable of dispersing the pigment and any opacifying agent used.

The invention may be used to provide tinted hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof. Materials for making soft contact lenses are well known and commercially available. Preferably, the lens material is acquafilcon, etafilcon, genfilcon, lenefilcon, balafilcon, lotrafilcon, or galyfilcon.

What is claimed is:

1. A method for producing a pattern for tinted contact lenses, comprising the steps of:
   a.) defining an inner and an outer pattern boundary;
   b.) selecting a starting angle, a travel distance, and a change angle;
   c.) selecting a starting string, an iteration string, and a number of iterations to be executed;
   d.) generating the pattern using at least one algorithm, wherein the algorithm is fractal in nature; and
   e.) producing a contact lens comprising the pattern.

2. The method of claim 1, wherein the at least one algorithm is derived from one of chaotic systems, diffusion systems, aggregation systems, L-systems, P-systems, cellular automata.

3. The method of claim 2, wherein the algorithm is derived from an L-system.

4. The method of claim 3, wherein the algorithm is derived from a modified L-system that is a $5^{th}$ order L-system constrained to produce a pattern P within a region defined by:

$$R_{outer} \pm \text{delta}_{outer} < P < R_{inner} \pm \text{delta}_{inner}$$

wherein $R_{outer} \pm delta_{outer}$ is a radius of a circle that is substantially equal to the average radius of a human iris plus or minus a fraction of the radius; and $R_{inner} \pm delta_{inner}$ is a radius of a circle that is substantially equal to the average radius of a human pupil plus or minus a fraction of the radius.

5. The method of claim 2, wherein the algorithm is derived from a diffusion system.

6. The method of claim 5, further comprising the steps of:
 a.) defining a boundary for a horizon and a substrate;
 b.) selecting a maximum and a minimum circle radius; and
 c.) generating a pattern using the algorithm.

7. A tinted contact lens produced using the method of claim 1.

8. A tinted contact lens produced using the method of claim 2.

9. A tinted contact lens produced using the method of claim 3.

10. A tinted contact lens produced using the method of claim 4.

11. A tinted contact lens produced using the method of claim 5.

12. A tinted contact lens produced using the method of claim 6.

* * * * *